United States Patent
Chen et al.

(10) Patent No.: US 7,756,222 B2
(45) Date of Patent: Jul. 13, 2010

(54) ADAPTIVE QUANTIZATION METHOD AND APPARATUS FOR AN OFDM RECEIVER

(75) Inventors: Jeng-Hong Chen, Temple City, CA (US); Yumin Lee, Taipei (TW); Yuh-Chun Lin, Irvine, CA (US)

(73) Assignee: Integrated System Solution Corporation, Hsinchu (TW)

( * ) Notice: Subject to any disclaimer, the term of this patent is extended or adjusted under 35 U.S.C. 154(b) by 1017 days.

(21) Appl. No.: 11/381,625

(22) Filed: May 4, 2006

(65) Prior Publication Data

US 2007/0258531 A1 Nov. 8, 2007

(51) Int. Cl.
*H04L 27/00* (2006.01)

(52) U.S. Cl. ............... 375/324; 375/316; 375/322; 375/354; 375/359; 455/23; 455/59; 455/69

(58) Field of Classification Search ......... 375/242–245, 375/322–324, 342–345, 295, 306, 316, 340, 375/354, 359, 259–260, 267, 348, 350, 371; 370/204, 208, 310, 476; 455/52, 59, 69
See application file for complete search history.

(56) References Cited

U.S. PATENT DOCUMENTS

| | | | | |
|---|---|---|---|---|
| 7,295,144 | B1 * | 11/2007 | Karthik et al. | 341/200 |
| 7,295,645 | B1 * | 11/2007 | El-Ghoroury et al. | 375/345 |
| 7,583,737 | B2 * | 9/2009 | Ido et al. | 375/260 |
| 7,590,171 | B2 * | 9/2009 | Chang et al. | 375/227 |
| 2005/0025076 | A1 * | 2/2005 | Chaudhuri et al. | 370/310 |
| 2005/0069054 | A1 * | 3/2005 | Zhidkov | 375/324 |
| 2005/0141649 | A1 * | 6/2005 | Tanabe | 375/340 |
| 2005/0190868 | A1 * | 9/2005 | Khandekar et al. | 375/346 |
| 2006/0073789 | A1 * | 4/2006 | Horisaki | 455/59 |
| 2006/0128318 | A1 * | 6/2006 | Agarossi et al. | 455/69 |

* cited by examiner

*Primary Examiner*—Shuwang Liu
*Assistant Examiner*—Hirdepal Singh
(74) *Attorney, Agent, or Firm*—Alston & Bird LLP

(57) ABSTRACT

A quadrature frequency division multiplexing ("OFDM") wireless receiver, including methods and devices for adaptive quantization of OFDM signals according to modulation and coding schemes and sub-carrier frequency responses, is provided. Efficient quantization may be utilized to reduce the large dynamic range of signals to achieve circuit simplification and chip area reduction. In one embodiment, a quantization circuit includes a quantization selector to select quantization thresholds according to modulation and coding schemes and sub-carrier frequency responses, and a non-uniform quantizer to reduce input dynamic range so that an output is represented by fewer bits than an input.

21 Claims, 5 Drawing Sheets

ADAPTIVE QUANTIZATION METHOD AND APPARATUS FOR AN OFDM RECEIVER

BACKGROUND OF THE INVENTION

The present invention relates generally to adaptive quantization and, more particularly, to an adaptive quantization method and device for an orthogonal frequency division multiplexing ("OFDM") receiver.

Orthogonal frequency division multiplexing ("OFDM") and punctured convolutional codes have been used in digital wireless communication systems, such as those defined by the wireless local area networks ("WLAN") standard, IEEE 802.11g, to provide bandwidth-efficient wireless communications and reduce signal distortion caused by multi-path propagation. FIG. 1 is a block diagram of a conventional wireless communications system. Referring to FIG. 1, the wireless communications system includes a transmitter 10, a channel 20 and a receiver 30. The transmitter 10 further includes a convolutional encoder 11, a puncturer 12, and an interleaver 13, which arranges its output into groups of $n_s$ bits and feeds them into a sub-carrier quadrature amplitude modulation ("QAM") mapper 14. The number of bits $n_s$ depends on the interleaving scheme, which may include one of BPSK ($n_s$=1), QPSK ($n_s$=2), 16-QAM ($n_s$=4), or 64-QAM ($n_s$=6). The sub-carrier QAM mapper 14 maps an OFDM symbol into multiple sub-carriers. For each of the sub-carrier QAM symbols, an OFDM modulator 15 performs an Inverse Fast Fourier Transform ("IFFT") to generate an OFDM symbol in the baseband, with each OFDM symbol being represented by $n_{OFDM}$ baseband samples. A PHY burst 16 receives these $n_{OFDM}$ data samples and adds the $n_{cp}$ cyclic prefix samples. The PHY Burst 16 also performs a windowing function and inserts before the first $n_{OFDM}+n_{cp}$ OFDM data samples the following baseband signaling samples: (1) a few short pre-amble OFDM symbols, (2) a few long pre-amble OFDM symbols, and (3) a signaling OFDM symbol in sequence. The cyclic prefix for each OFDM symbol provides a guard time for multi-path mitigation at a receiver. The windowing function serves to lower the side-lobes of the transmit spectrum and hence helps minimize adjacent channel interference. The short pre-amble symbols are used for packet detection, automatic gain control, and coarse frequency estimation at the receiver. The long pre-amble symbols are used for fine frequency estimation and channel estimation at the receiver. The signaling OFDM symbol contains information such as the sub-carrier modulation and coding scheme ("MCS") required for receiver operation. Next, an RF transmitter 17 receives the output of the PHY burst 16 and performs all transmitter functions such as digital-to-analog conversion, filtering, up-conversion, amplification, and radiation into the air. The output of the RF transmitter 17, an analog waveform, is transmitted over a channel 20, typically a "multi-path propagation" channel, and received at the receiver 30.

At the receiver 30, an acquisition and tracking 32 first uses the received base-band signal samples from the RF receiver 31 to detect the OFDM pre-amble and estimates the OFDM symbol boundaries. A Useful Data device 33 takes a block of the received base-band signal samples corresponding to one received OFDM symbol, removes the samples for the cyclic prefix and outputs only the useful $n_{OFDM}$ samples. An OFDM demodulator 34 takes one block of $n_{OFDM}$ samples at a time and performs a Fast Fourier Transform ("FFT") to recover the m sub-carrier QAM symbols. A channel estimator 35 takes the FFT outputs for the long pre-ambles from the OFDM demodulator 34 and estimates the sub-carrier channel frequency responses ("CFR"), $G_{ch}(i)$, where i=0, 1, ..., m−1, for all m sub-carrier channels. A QAM demapper 36 generates a total of $m \cdot n_s$ soft-bits as outputs for each OFDM symbol, with $n_s$ soft-bits for each sub-carrier QAM symbol and each soft-bit containing the information required for Viterbi decoding.

These output $m \cdot n_s$ soft-bits are "de-interleaved" by a de-interleaver 37 to recover their order and then delivered to the a de-puncturer 38, where the "punctured" bits are inserted back. The outputs from de-puncturer 38 are sent to a convolutional decoder 39, which performs an optimum decoding using the well-known Viterbi decoding algorithm and outputs decoded user information.

For wireless communications utilizing OFDM modulation, each QAM symbol can contain up to 6 bits with 64-QAM modulated sub-carriers. In addition, the sub-carrier channel frequency responses, $G_{ch}(i)$, can vary in amount by 20 dB due to multi-path fading. Therefore, additional 11 to 13 bits may be required to represent each of the sub-carrier QAM demapper output. To process signals with such a large dynamic range, complex hardware is required in downstream processors such as the de-interleaver 37, depuncturer 38 and decoder 39. It is desirable to have a simplified receiver design which can reduce the complexity caused by different modulation coding schemes and variations among sub-carriers.

BRIEF SUMMARY OF THE INVENTION

In accordance with an embodiment of the present invention, there is provided a quantization method for a wireless receiver that comprises receiving demapped QAM symbols for each of a plurality of sub-carriers from a QAM demapper, selecting quantization thresholds according to modulation and coding schemes and sub-carrier frequency responses, conducting a non-linear quantization to reduce the dynamic range of the demapped QAM symbols, and providing quantized symbols to the de-interleaver.

Also in accordance with the present invention, there is provided a quantization method for an orthogonal frequency division multiplexing (OFDM) receiver including a plurality of modulation and coding schemes and a plurality of sub-carriers for wireless communication in a multi-path environment, the quantization method comprising selecting quantization thresholds according to the modulation and coding schemes and sub-carrier frequency responses, and conducting a non-linear quantization to reduce the dynamic range of signals.

Still in accordance with the present invention, there is provided a orthogonal frequency division multiplexing (OFDM) receiver comprising an adaptive quantization circuit that comprises a quantization selector wherein quantization thresholds are determined according to modulation and coding scheme and sub-carrier frequency responses, and a non-uniform quantizer wherein a signal dynamic range is reduced and wherein an output is represented by fewer bits than an input.

Another aspect of the invention relates to a quantization method for an OFDM wireless receiver including a plurality of modulation and coding schemes, a plurality of sub-carriers, an OFDM de-modulator, a channel estimator, a QAM de-mapper and a de-interleaver. In one embodiment, the quantization method further includes receiving demapped QAM symbols for each sub-carrier from the QAM demapper, selecting quantization thresholds according to modulation coding scheme and sub-carrier frequency responses, conducting non-linear quantization to reduce the dynamic range of signals, and delivering the quantized signal to the de-interleaver.

Still another aspect of the present invention relates to an OFDM receiver including a plurality of modulation and coding schemes, a plurality of sub-carriers for wireless communication in a multi-path environment, and an adaptive quantization circuit. In one embodiment, the quantization circuit further comprises a quantization selector to select quantization thresholds according to modulation coding scheme and sub-carrier frequency responses, and a non-uniform quantizer to reduce input dynamic range so that the output is represented by fewer bits than the input.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The present invention relates to an OFDM wireless receiver, including methods and devices for adaptive quantization of OFDM signals according to modulation and coding scheme and sub-carrier frequency response. The present invention provides efficient quantization to reduce the large dynamic range of signals to achieve circuit simplification and substantial chip area reduction.

The dynamic range of OFDM signals is determined by its modulation and coding scheme and variations among its sub-carrier frequency responses. For example, after the FFT processing, channel equalizing and soft-bit extracting, each "soft-bit" of a 64-QAM symbol for a sub-carrier may result in more than 10 bits in the hardware implementation.

Figure 1:
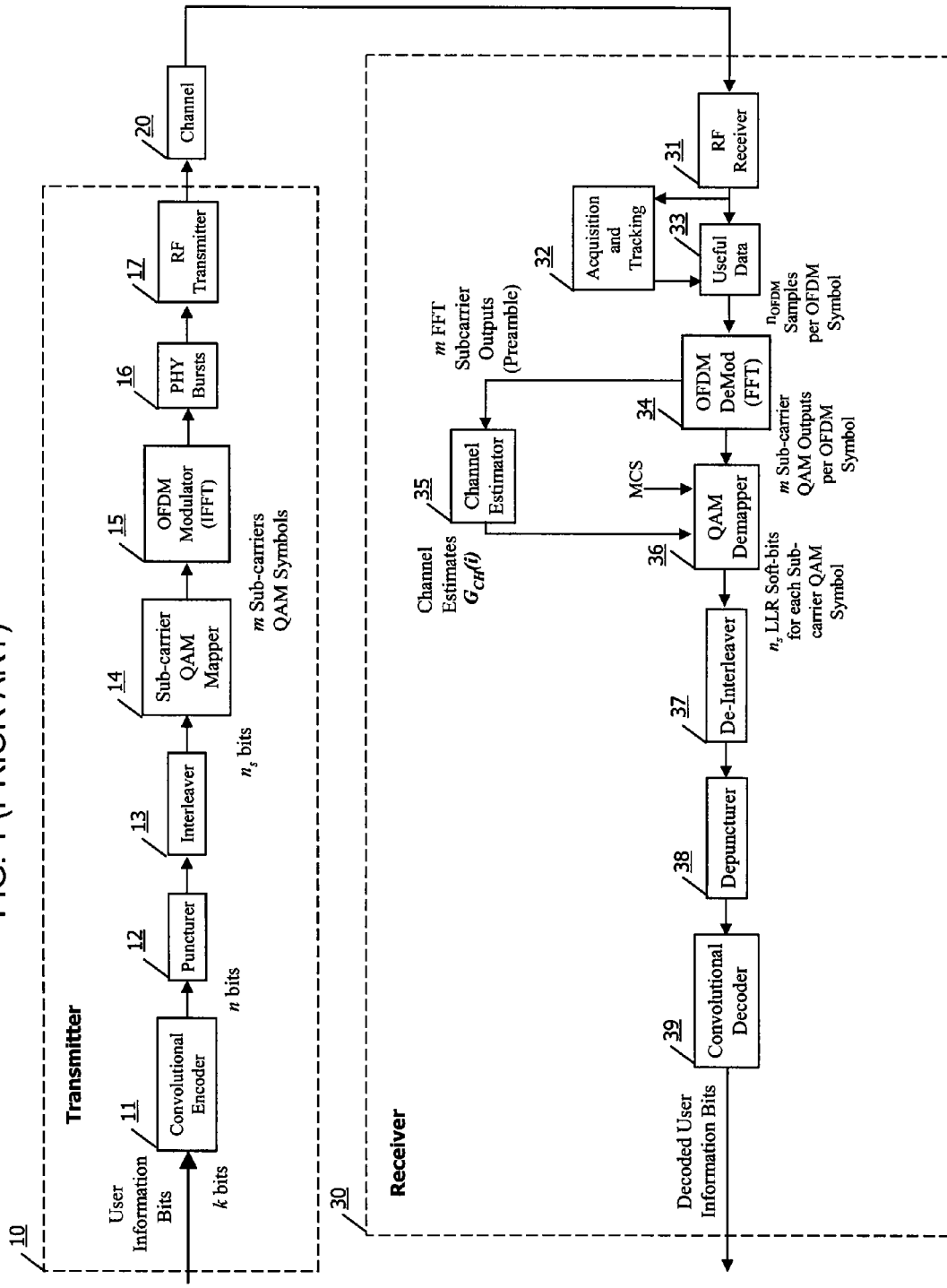
FIG. 1 is a block diagram of a conventional wireless communications system employing both OFDM modulation and punctured convolutional code.

In addition, the sub-carrier channel frequency response, $G_{ch}(i)$, can vary by 10 to 20 dB or even 30 dB due to multi-path fading. In order to accommodate a 20 dB variation in channel frequency response, additional seven bits are required. Therefore, the number of bits qQAM required to represent each of the sub-carrier QAM demapper output "soft-bits" may be as high as 13. Such a large dynamic range leads to complex hardware implementation in downstream processing units such as the de-interleaver 37, de-puncturer 38 and convolutional decoder 39 illustrated in FIG. 1. It is therefore desirable to have an OFDM receiver utilizing an efficient fixed q-bit quantizer, with q<<qQAM, which may lead to substantial simplification in the design and implementation of the receiver.

Figure 2:
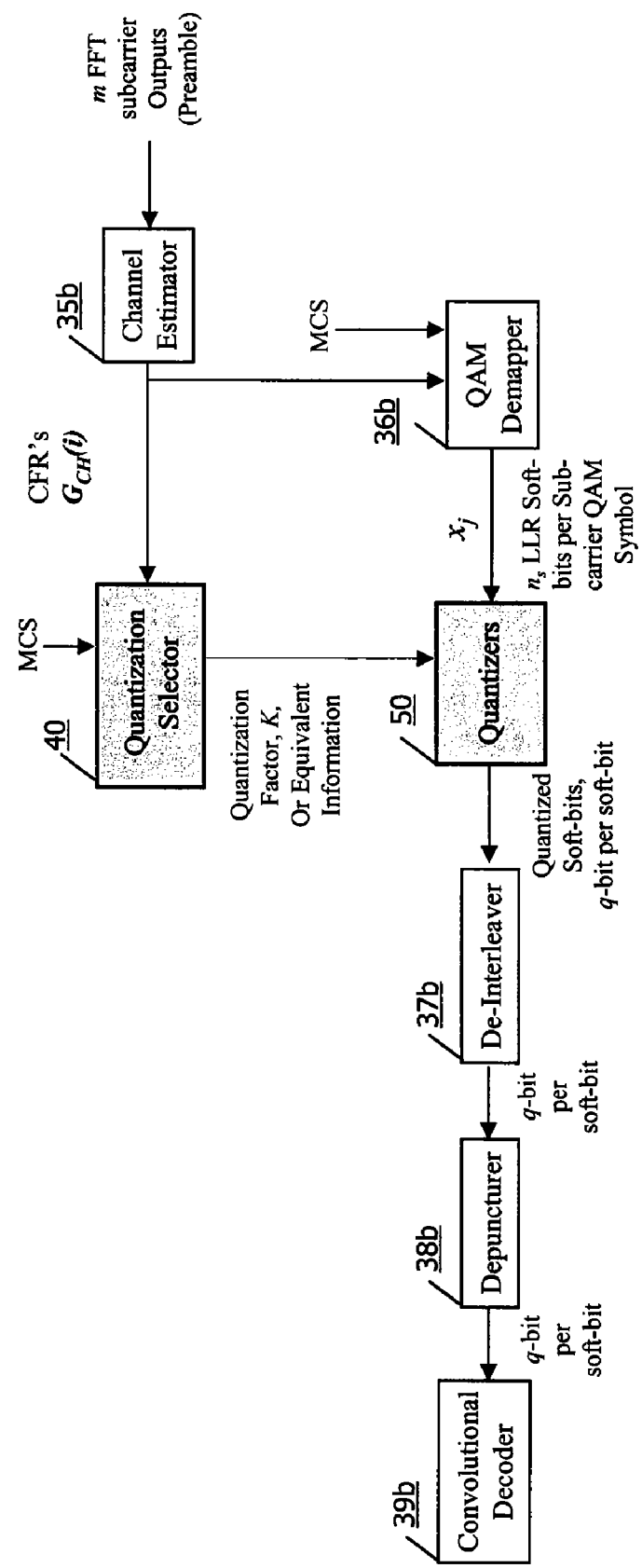
FIG. 2 is a block diagram of a portion of a wireless receiver according to an embodiment of the present invention.

FIG. 2 is a block diagram of a portion of a wireless receiver according to an embodiment of the present invention, including a quantization selector 40 and a quantizer 50. The quantization selector 40 computes an optimal quantization factor K based on (1) Modulation and coding scheme (MCS) information contained in the signaling OFDM symbol and (2) m sub-carrier channel estimates from a channel estimator 35b. The quantizer 50, disposed between a QAM demapper 36b and a de-interleaver 37b, uses the K value to select optimum non-uniform thresholds for quantization. In one embodiment of the present invention, the non-uniform quantizer is based on the following transformation:

$$g(x_j) = sgn(x_j)\left[1 - \exp\left(-\frac{|x_j|}{K}\right)\right]. \quad (1)$$

where the input is denoted as $x_j$, the transform output is denoted as $g(x_j)$, and sgn(•) is the algebraic sign function defined as follows:

$$sgn(x_j) = \begin{cases} 1, & x_j > 0 \\ 0, & x_j = 0 \\ -1, & x_j < 0 \end{cases} \quad (2)$$

Figure 3:
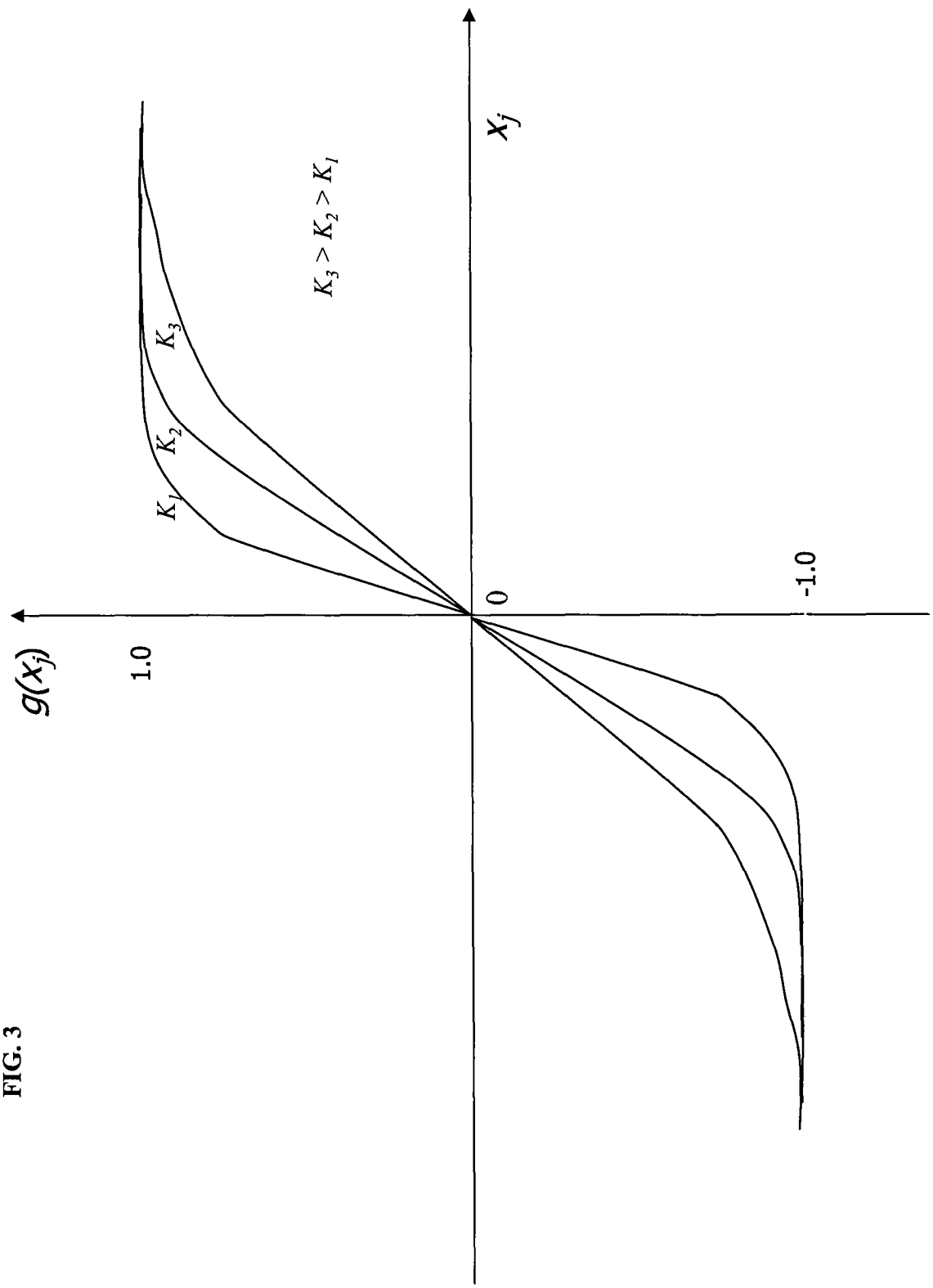
FIG. 3 is a plot illustrates a quantization transformation function according to an embodiment of the present invention.

Note that the nonlinear transformation maps an unbounded real number $x_j$ into a finite real number in (−1, 1), thus compressing the dynamic range of the input soft bit $x_j$. In the Eq. (1), K is a positive number determined by the quantization selector 40, which provides flexibility in quantizing the input. FIG. 3 is a plot illustrates a quantization transformation function according to an embodiment of the present invention for three different K values. Let's assume a fixed q-bit quantizer is used. For a smaller K value, the quantized output has a better resolution for smaller soft-bit input, whereas the quantized output has less resolution for a smaller input when a greater K value is used. For a frequency-selective fading channel, the dynamic range of signal power is larger than that of a frequency-nonselective fading channel and hence requires a larger quantization factor K. Furthermore, if power normalization is implemented for a high-order sub-carrier modulation scheme (e.g., 64-QAM), the constellation of inner signal points requires finer power resolution. The optimum quantization factor K for 64-QAM based OFDM will be smaller than that for BPSK-based OFDM. Appropriate quantization factor K and q are selected to minimize hardware complexity according to the channel characteristics and modulation scheme.

For a q-bit quantizer, the output of the nonlinear transformation is then processed by the following midrise uniform quantization to obtain a nonnegative integer $y_j$:

$$y_j \equiv \lfloor 2^{q-1} g(x_j) \rfloor \mod 2^q = \begin{cases} \lfloor 2^{q-1} g(x_j) \rfloor, & \text{if } x_j \geq 0 \\ \lfloor 2^{q-1} g(x_j) \rfloor + 2^q, & \text{if } x_j < 0 \end{cases}, \quad (3)$$

where $\lfloor . \rfloor$ denotes the largest integer less than or equal to the argument, e.g., $\lfloor 1.2 \rfloor = 1$ and $\lfloor -0.82 \rfloor = -1$. The Quantizer 50 output is then the q-bit binary representation $b_j$ of $y_j$:

$$b_j = [b_{j,q-1}, b_{j,q-2}, \ldots, b_{j,0}] \quad (4)$$

such that $b_{j,i} \in \{0, 1\}$ and $$\sum_{i=0}^{q-1} b_{j,i} 2^i = y_j.$$

In other words, if the input $x_j$ is non-negative, the intermediate output $y_j$ is an integer in $[0, 2^{q-1}-1]$. For a negative input $x_j$, the intermediate output $y_j$ is an integer in $[2^{q-1}, 2^q-1]$. For each input soft-bit represented by $q_{QAM}$ bits, the quantizer 50 generates a corresponding "quantized" soft-bit, each being represented by q bits, as its output. For a receiver including the quantizer 50 illustrated in FIG. 2, q may be much smaller than $q_{QAM}$, and the hardware complexity of the de-interleaver 37b and all subsequent functional blocks such as the de-puncturer 38b and convolutional decoder 39b may be simplified.

Figure 4:
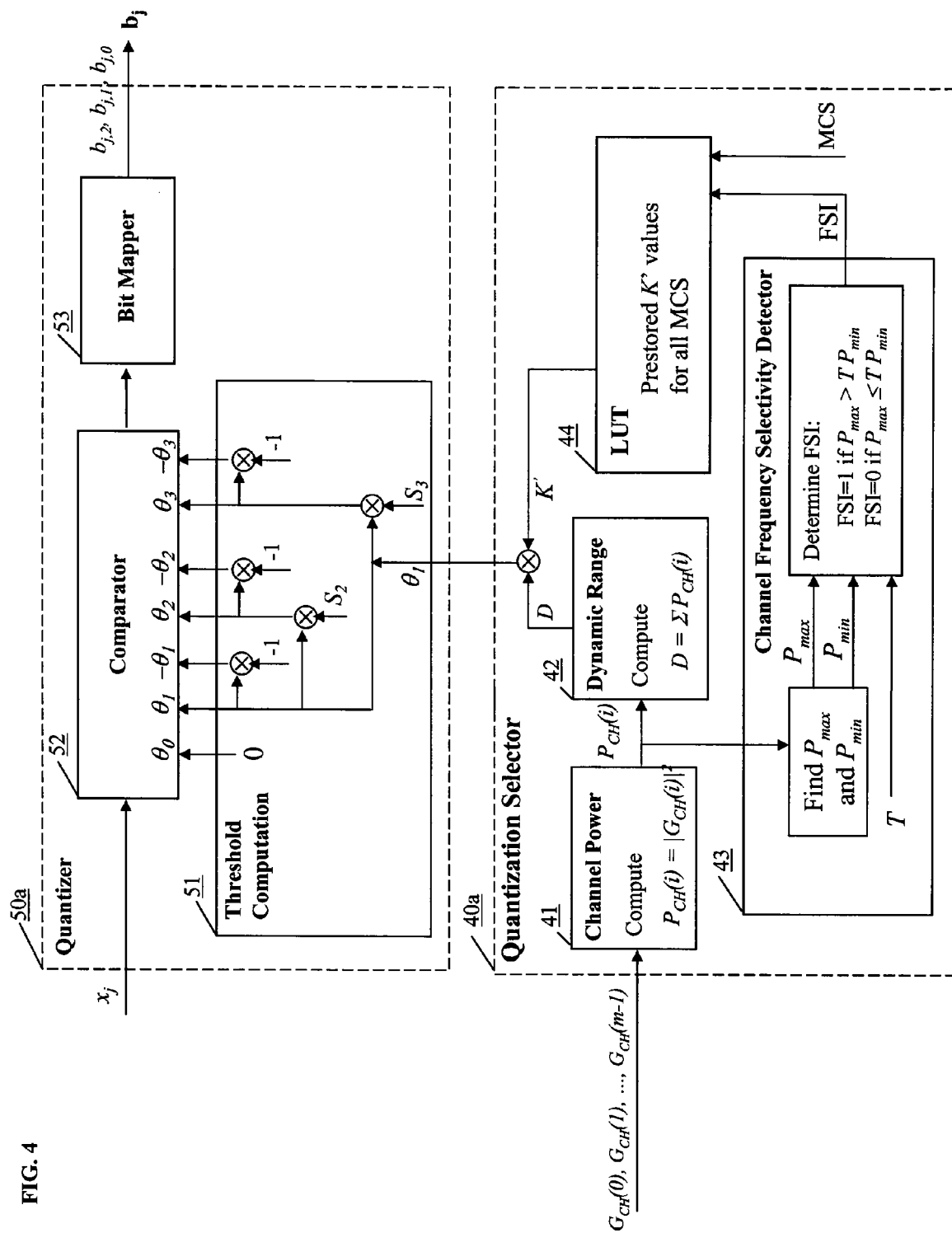
FIG. 4 is a block diagram illustrating a quantization selector and a quantizer of a wireless receiver according to an embodiment of the present invention.

FIG. 4 is a block diagram illustrating a quantization selector 40a and a quantizer 50a of a wireless receiver according to another embodiment of the present invention. Referring to FIG. 4, the quantization selector 40a receives the following inputs: (1) the modulation and coding scheme (MCS), and (2) the sub-carrier CFR's, $G_{CH}(i)$, $i=0, 1, \ldots, m-1$. The MCS information is contained in the signaling OFDM symbol immediately after the pre-ambles and before the data OFDM symbols. The sub-carrier CFR's are obtained in the channel estimator 35b illustrated in FIG. 2 using the long pre-amble symbols.

A channel power calculator 41 receives the CFR's and computes the power for each sub-carrier channel, $P_{ch}(i)$, according to the following equation:

$$P_{CH}(i) = |G_{CH}(i)|^2. \quad (5)$$

A dynamic range calculator 42 computes a signal dynamic range, D, according to the following equation:

$$D = \sum_{i=0}^{m-1} P_{CH}(i). \quad (6)$$

A channel frequency selectivity detector 43 computes a frequency selectivity indicator ("FSI") using an algorithm as follows.

Step 1: The channel frequency selectivity detector 43 takes the CFR's as its input and determines the maximum and minimum of the CFR's as follows:

$$P_{max} = \max_i \{P_{CH}(i)\}, \quad (7a)$$

and $$P_{min} = \min_i \{P_{CH}(i)\}, \quad (7b)$$

where the max{ } and the min{ } functions compute the maximum and minimum values of $P_{CH}(i)$, $i=0, 1, \ldots, m-1$.

Step 2: The ratio $R = P_{max}/P_{min}$ is computed and compared to a threshold T, where T is a design parameter and is always greater or equal to 1. If the ratio is smaller than the threshold T, then the channel frequency response is relatively constant over the signal band. In this case, FSI is set to 0 to indicate that the channel is frequency-nonselective. If the ratio is not smaller than the threshold, the channel frequency response actually varies substantially over the signal band. In this case, FSI is set to 1 to indicate that the channel is frequency selective.

Based on the receiver architecture illustrated in FIG. 4, a computer simulation platform may be built to evaluate the packet error rate ("PER") performance of a receiver for an additive white Gaussian channel ("AWGN") and various multi-path propagation channels. The optimum value for T ranges from approximately 5 to 30 dB based on comprehensive computer simulation results. For a different wireless communication environment, the T value may be similarly optimized according to design parameters.

For a quantizer with q-bit output, a total of $2^q-1$ thresholds are required. In the embodiment of the present invention illustrated in FIG. 4, thresholds $\theta_0$, $\pm\theta_1$, $\ldots$, $\pm\theta_{2^{q-1}-1}$ are chosen, with $\theta_0$ is set to 0. The base threshold, $\theta_1$, can be derived from the transformation in Eq. (1) as follows:

$$\theta_1 = K \ln\left(\frac{2^{q-1}}{2^{q-1}-1}\right) \quad (8)$$

To simplify the implementation, a normalized quantization factor, K', is defined in Eq. (9) below.

$$\theta_1 = K \ln\left(\frac{2^{q-1}}{2^{q-1}-1}\right) \equiv K'D \quad (9)$$

where the base quantization threshold, $\theta_1$, is obtained from the product of K' and D. The optimum value for K' is dependent on the MCS and, therefore, can be pre-calculated and stored in a Look-up Table ("LUT" 44 shown in FIG. 4). An example of the LUT, which lists the selected K' values for all the MCS in the IEEE 802.11g or 802.11a WLAN standards, is shown in Table 1.

TABLE 1

LOOK-UP TABLE of data rates and corresponding K' values

| 802.11g or 802.11a Data Rates (Mbps) | MCS | | Normalized Quantization Factor K' | |
|---|---|---|---|---|
| | Modulation | Coding Rate | FSI = 0 $K_{b1} = 2^{-5}$ | FSI = 1 $K_{b0} = 2^{-4}$ |
| 6 | BPSK | 1/2 | $8 \times K_{b1}$ | $10 \times K_{b0}$ |
| 9 | BPSK | 3/4 | $4 \times K_{b1}$ | $8 \times K_{b0}$ |
| 12 | QPSK | 1/2 | $4 \times K_{b1}$ | $8 \times K_{b0}$ |
| 18 | QPSK | 3/4 | $4 \times K_{b1}$ | $4 \times K_{b0}$ |
| 24 | 16-QAM | 1/2 | $2 \times K_{b1}$ | $4 \times K_{b0}$ |
| 36 | 16-QAM | 3/4 | $2 \times K_{b1}$ | $2 \times K_{b0}$ |
| 48 | 64-QAM | 2/3 | $1 \times K_{b1}$ | $2 \times K_{b0}$ |
| 54 | 64 QAM | 3/4 | $1 \times K_{b1}$ | $1 \times K_{b0}$ |

The first column of Table 1 shows all of the 802.11g or 802.11a data rates supported by the OFDM modulation. The second column lists the corresponding modulation and coding schemes (MSC) with modulation and code-rate in two separate sub-columns. The third column shows the normalized quantization factor K' with a first sub-column showing the K' values for frequency non-selective channels (FSI=0) and a second sub-column showing the K' values for frequency selective channels (FSI=1).

In order to further reduce hardware complexity, all of the other quantization thresholds may be computed as constant multiples of the base threshold, $\theta_1$:

$$\theta_t = \theta_1 \times S_t, t = 2, \ldots, 2^{q-1} - 1, \quad (10)$$

where (11)

$$S_1 = \frac{\theta_t}{\theta_1} = \frac{(q-1)\ln(2) - \ln(2^{q-1} - t)}{(q-1)\ln(2) - \ln(2^{q-1} - 1)},$$
$$t = 2, \ldots, 2^{q-1} - 1.$$

The $S_t$'s are derived from Eq. (1) and may be pre-calculated and stored.

According to an embodiment of the present invention, a three-bit quantizer (q=3) is illustrated in FIG. 4. A threshold computation 51 circuit computes the base quantization threshold, $\theta_1$, in response to the two inputs, K' and D, from the quantization selector 40a and multiplying K' by D. The threshold computation circuit 51 then computes $\theta_2$ and $\theta_3$ by multiplying $\theta_1$ by $S_2$ and $\theta_1$ by $S_3$, respectively, and flips the sign of the positive thresholds, $\theta_1$, $\theta_2$, $\theta_3$ to generate the negative thresholds: $-\theta_1$, $-\theta_2$, $-\theta_3$. The outputs of this threshold computation circuit 51 are the thresholds for the three-bit quantizer: $-\theta_3$, $-\theta_2$, $-\theta_1$, $\theta_0$, $\theta_1$, $\theta_2$, $\theta_3$, which are summarized below:

$$\theta_0 = 0 \quad (12)$$

$$\theta_1 = K \ln(4/3) = K' \times D$$

$$\theta_2 = K \ln(2) = \theta_1 \times S_2, \text{ where } S_2 = \left[\frac{\ln 2}{\ln(4/3)}\right]$$

$$\theta_3 = K \ln(4) = \theta_1 \times S_3, \text{ where } S_3 = \left[\frac{\ln 4}{\ln(4/3)}\right]$$

The multiples given in (12) can be approximated as follows:

$$(S_2, S_3) \approx (2.5, 5) \text{ or } (2, 4) \quad (13)$$

Note that the approximation in Eq. (13) can be expressed as a sum of 2's power, the threshold calculation can be further simplified using shift-and-add digital circuits, e.g., $$2.5 \, \theta_1 = \theta_1 \times 2 + \theta_1 \times 2^{-1}. \quad (14)$$

In response to these thresholds, a comparator 52 compares its input soft-bit, $x_j$, to the thresholds: $\theta_0$, $\pm\theta_1$, $\pm\theta_2$, $\pm\theta_3$, and determines its intermediate output $y_j$ as follows:

$$y_j = \begin{cases} 3, & \text{if } x_j \geq \theta_3 \\ i, & \text{if } \theta_i \leq x_j < \theta_{i+1} \text{ for } i \in \{0,1,2\} \\ 2^3 - i, & \text{if } -\theta_i \leq x_j < -\theta_{i-1} \text{ for } i \in \{1,2,3\} \\ 4, & \text{if } x_j \leq -\theta_3 \end{cases} \quad (15)$$

In FIG. 4, a bit mapper 53 receives the comparator 52 output $y_j$ and provides the q-bit binary representation $b_j$ for $y_j$. If the input $x_j$ is non-negative, the intermediate output $y_j$ is an integer in [0,3]. For a negative input $x_j$, the intermediate output $y_j$ is an integer in [4,7]. The final output, denoted as $b_j$, is the q-bit binary representation of $y_j$:

$$b_j = [b_{j,2}, b_{j,2}, b_{j,0}] \text{ such that} \quad (16)$$

$$b_{j,i} \in \{0, 1\} \text{ and } \sum_{i=0}^{2} b_{j,i} 2^i = y_j$$

Figure 5:
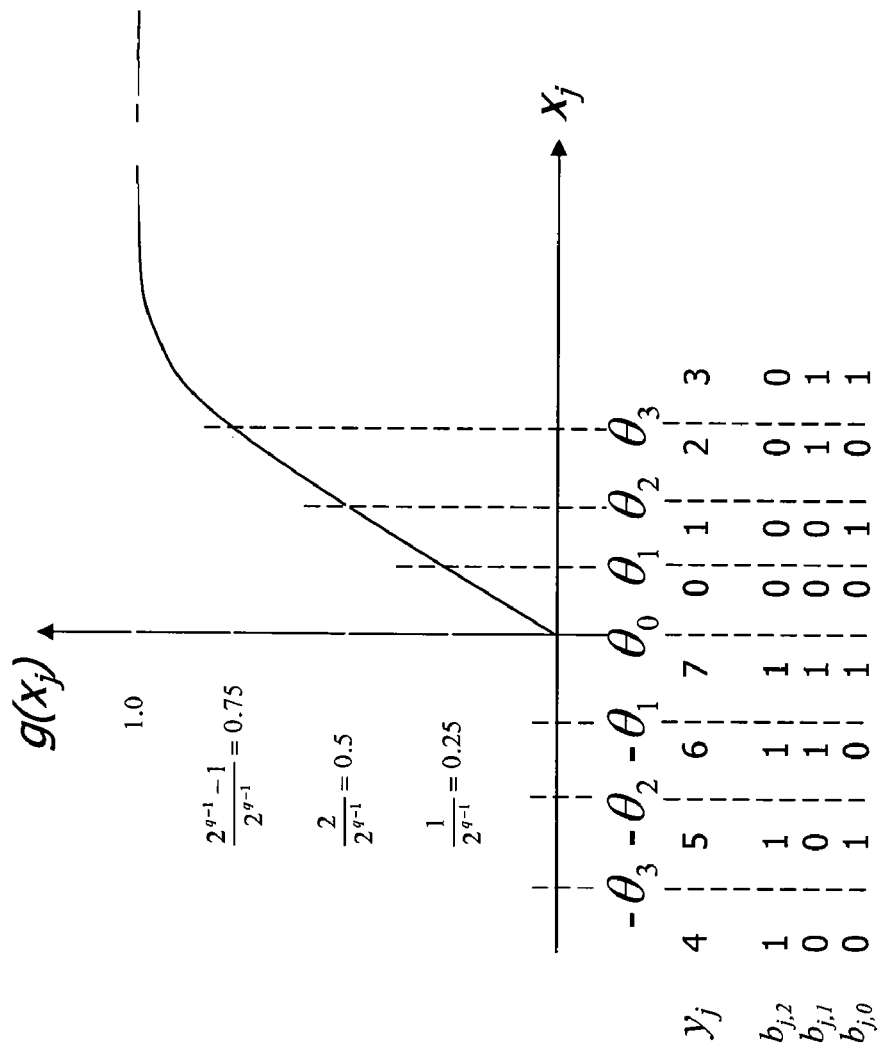
FIG. 5 is a plot illustrating the quantization thresholds from the quantization transformation function for a wireless receiver according to an embodiment of the present invention.

FIG. 5 shows the input $x_j$ and the 3-bit quantized output for $b_j=[b_{j,2}, b_{j,1}, b_{j,0}]$, along with the transformation function and quantization thresholds for the three-bit quantizer. For example, if $x_j$ is greater than $\theta_3$, then the 3-bit quantized output will be $b_j=[0,1,1]$. If $x_j$ is between $-\theta_2$ and $-\theta_1$, then the output will be $b_j=[1,1,0]$.

A comprehensive computer simulation based on the architectures illustrated in FIGS. 2 and 4 may be performed to evaluate receiver performance in order to determine the optimum design for the quantization selector and the quantizer. Simulation results show that q, with all other parameters being optimized, may be as small as approximately 3 or 4, which does not adversely affect the receiver performance. Since q is much smaller than $q_{QAM}$ in the present example, the complexity of the downstream processing units such as the de-interleaver 37b, de-puncturer 38b, and convolutional decoder 39b may be greatly reduced.

Furthermore, the values of K' corresponding to different MCS and FSI are chosen as power-of-two multiples of the base values $K_{b0}$ and $K_{b1}$, which can be a power-of-two themselves, as shown in Table 1. For instance, if the rate is 12 Mbps and the frequency-selective fading channel is determined by the channel estimator (FSI=1), then the base quantization threshold $\theta_1$ is computed as the multiplication of $8K_{b0}$ and the sum of estimated channel powers Eq. (12). All of the other thresholds are computed from Eq. (14). Therefore, all computations may be implemented from the shift-and-add digital circuits.

As discussed above, the non-linear transformation described in Eq. (1), which maps the un-bounded input values to a finite region (−1, 1), is useful to reduce the required number of quantization bits. Furthermore, since an appropriate quantization factor is selected according to the different modulation methods, coding schemes, channel fading characteristics (from Table 1), and the instant estimated channel powers from Eq. (12), the required quantization bits, q, may be minimized. Furthermore, the quantization thresholds may be implemented from simple shift-and-add digital circuits, which further reduce hardware complexity.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method of dynamic quantization in an orthogonal frequency division multiplexing (OFDM) system, the method comprising:
    receiving quadrature amplitude modulation (QAM) symbols for each of a number of "m" sub-carrier channels, m being an integer greater than 1;
    computing a channel power $P_{CH}(i)=|G_{CH}(i)|^2$ for each of the m sub-carrier channels, where $G_{ch}(i)$ is the $i^{-th}$ sub-carrier channel frequency response, i being an integer from 0 to m−1;
    computing
    $$P_{max} = \max_i \{P_{CH}(i)\},$$
    where the max{ } function computes the maximum value of $P_{CH}(i)$;
    computing
    $$P_{min} = \min_i \{P_{CH}(i)\},$$
    where the min{ } function computes the minimum value of $P_{CH}(i)$;
    setting a first frequency selectivity indicator (FSI) value if $P_{max} \geq T*P_{min}$ and setting a second FSI value if $P_{max} < T*P_{min}$, wherein T is a predetermined threshold value;
    determining a quantization parameter, K, which is a positive real number selected according to the first or second FSI value;
    applying an exponential function to the received QAM symbol, $x_i$ for the i-th subcarrier, according to the following equation:

$$g(x_j) = \text{sgn}(x_j)\left[1 - \exp\left(-\frac{|x_j|}{K}\right)\right],$$

$$\text{sgn}(x_j) = \begin{cases} 1, & x_j > 0 \\ 0, & x_j = 0 \\ -1, & x_j < 0 \end{cases},$$

where $g(x_i)$ is a transform output of $x_i$;
    determining a set of ($2^q-1$) quantization thresholds according to the first and second FSI values for a q-bit quantization output in the OFDM system, wherein q is a positive integer; and
    quantizing the exponential function outputs, $g(x_i)$ for all the sub-carriers.

2. The method of claim 1 further comprising:
    quantizing the received QAM symbol $x_i$ into a q-bit output including $2^q$ levels according to the ($2^q-1$) quantization thresholds, $\theta_0, \pm\theta_1, \ldots, \pm\theta_{2^{q-1}-1}$.

3. The method of claim 2, wherein $$\theta_0 = 0, \theta_1 = K\ln\left(\frac{2^{q-1}}{2^{q-1}-1}\right), \text{ and } \theta_t = \theta_1 \times S_t, \text{ where}$$

$$S_t = \frac{\theta_t}{\theta_1} = \frac{(q-1)\ln(2) - \ln(2^{q-1}-t)}{(q-1)\ln(2) - \ln(2^{q-1}-1)}, \quad t = 2, \ldots, 2^{q-1}-1.$$

4. The method of claim 3, wherein $S_t$ is approximated to an integer.

5. The method of claim 3, wherein $$q = 3, \theta_0 = 0, \theta_1 = K\ln\left(\frac{4}{3}\right),$$

$$S_2 = \left[\frac{\ln 2}{\ln(4/3)}\right] \text{ and } S_3 = \left[\frac{\ln 4}{\ln(4/3)}\right].$$

6. The method of claim 5, wherein $S_2=2$ and $S_3=4$ and wherein the quantization thresholds $\theta_0, \pm\theta_1, \pm\theta_2, \pm\theta_3$ for a 3-bit quantized output are computed as follows:

$\theta_0=0, \theta_1=K'\times D, \theta_2=\theta_1\times 2$ and $\theta_3=\theta_1\times 4$.

7. The method of claim 5, wherein $S_2=2.5$ and $S_3=5$ and wherein the quantization thresholds $\theta_0, \pm\theta_1, \pm\theta_2, \pm\theta_3$ 3-bit quantized output are computed as follows:

$\theta_0=0, \theta_1=K'\times D, \theta_2=\theta_1\times 2.5$ and $\theta_3=\theta_1\times 5$.

8. The method of claim 1 further comprising:
    computing the total channel power to determine a dynamic range $$D = \sum_{i=0}^{m-1} P_{CH}(i);$$

selecting K' for the first or second FSI values; and
computing K by multiplying K' by D, $K=K'\times D$.

9. The method of claim 8 further comprising a look-up table to provide values of K' based on the first and second FSI values from the channel frequency selectivity detector and sub-carrier modulation and coding scheme (MCS) information, wherein K=K'×D.

10. The method of claim 1, wherein the first FSI value is set to one and the second FSI value is set to zero.

11. A receiver for dynamic quantization in an orthogonal frequency division multiplexing (OFDM) system, the receiver comprising:
a channel power calculator to compute a channel power $P_{CH}(i)=|G_{CH}(i)|^2$ for each of "m" sub-carrier channels, where $G_{ch}(i)$ is the $i^{-th}$ sub-carrier channel frequency response, i being an integer from 0 to m−1; and
a channel frequency selectivity detector to compute $$P_{max} = \max_i \{P_{CH}(i)\},$$

where the max{ } function computes the maximum value of $P_{CH}(i)$, compute $$P_{min} = \min_i \{P_{CH}(i)\},$$

where the min{ } function computes the minimum value of $P_{CH}(i)$, and set a first frequency selectivity indicator (FSI) value if $P_{max} \geq T^*P_{min}$ and a second FSI value if $P_{max} < T^*P_{min}$, wherein T is a predetermined threshold value; and
a q-bit exponential quantizer comprising
processing the received QAM symbols, $x_i$, for the i-th subcarrier, according to the following exponential equation:

$$g(x_j) = \mathrm{sgn}(x_j)\left[1 - \exp\left(-\frac{|x_j|}{K}\right)\right],$$

$$\mathrm{sgn}(x_j) = \begin{cases} 1, & x_j > 0 \\ 0, & x_j = 0, \\ -1, & x_j < 0 \end{cases}$$

where $g(x_i)$ is a transform output of $x_i$, and the quantization parameter K is a positive real number;
where x is either one real value of the received complex QAM symbol $x_i$, and the quantization parameter K is a positive real number;
determining a set of $(2^q-1)$ quantization thresholds according to the first or second FSI value for a q-bit quantization output in the OFDM system, wherein q is a positive integer; and
quantizing the exponential function outputs, for all the subcarriers.

12. The receiver of claim 11, wherein the first FSI value is set to 1 and the second FSI value is set to 0.

13. The receiver of claim 11, wherein the quantization parameter, K, is selected according to the first or second FSI values.

14. The receiver of claim 11 comprising:
quantizing the received QAM symbol $x_i$ into a q-bit into a q-bit output including $2^q$ levels according to the $(2^q-1)$ quantization thresholds, $\theta_0, \pm\theta_1, \ldots, \pm\theta_{2^{q-1}-1}$.

15. The receiver of claim 14, wherein $$\theta_0 = 0,\ \theta_1 = K\ln\left(\frac{2^{q-1}}{2^{q-1}-1}\right),\ \text{and}\ \theta_t = \theta_1 \times S_t,\ \text{where}$$

$$S_t = \frac{\theta_t}{\theta_1} = \frac{(q-1)\ln(2) - \ln(2^{q-1}-t)}{(q-1)\ln(2) - \ln(2^{q-1}-1)},\ t = 2, \ldots, 2^{q-1}-1.$$

16. The receiver of claim 15, wherein $$q = 3,\ \theta_0 = 0,\ \theta_1 = K\ln\left(\frac{4}{3}\right),$$

$$S_2 = \left[\frac{\ln 2}{\ln(4/3)}\right]\ \text{and}\ S_3 = \left[\frac{\ln 4}{\ln(4/3)}\right].$$

17. The receiver of claim 16, wherein $S_2=2$ and $S_3=4$ and wherein the quantization thresholds $\theta_0, \pm\theta_1, \pm\theta_2, \pm\theta_3$ for a 3-bit quantized output are computed as follows:

$\theta_0=0, \theta_1=K'\times D, \theta_2=\theta_1\times 2$ and $\theta_3=\theta_1\times 4$.

18. The receiver of claim 16, wherein $S_2=2.5$ and $S_3=5$ and wherein the quantization thresholds $\theta_0, \pm\theta_1, \pm\theta_2, \pm\theta_3$ for a 3-bit quantized output are computed as follows:

$\theta_0=0, \theta_1=K'\times D, \theta_2=\theta_1\times 2.5$ and $\theta_3=\theta_1\times 5$.

19. The receiver of claim 15, wherein $S_t$ is approximated to an integer.

20. The receiver of claim 11 further comprising:
computing the total channel power to determine a dynamic range $$D = \sum_{i=0}^{m-1} P_{CH}(i);$$

selecting K' for the first or second FSI value; and
computing K by multiplying K' by D, K=K'×D.

21. The receiver of claim 20 further comprising a look-up table to provide values of K' based on the first and second FSI values from the channel frequency selectivity detector and sub-carrier modulation and coding scheme (MCS) information, wherein K=K'×D.

* * * * *